United States Patent
Baukes et al.

(10) Patent No.: US 11,575,701 B2
(45) Date of Patent: *Feb. 7, 2023

(54) NETWORK ISOLATION BY POLICY COMPLIANCE EVALUATION

(71) Applicant: Upguard, Inc., Mountain View, CA (US)

(72) Inventors: Michael Franz Baukes, Sunnyvale, CA (US); Alan James Sharp-Paul, Los Altos, CA (US)

(73) Assignee: Upguard, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,618

(22) Filed: Jun. 21, 2021

(65) Prior Publication Data

US 2021/0314344 A1    Oct. 7, 2021

Related U.S. Application Data

(63) Continuation of application No. 16/540,055, filed on Aug. 14, 2019, now Pat. No. 11,075,940, which is a continuation of application No. 16/149,144, filed on Oct. 2, 2018, now Pat. No. 10,440,045, which is a
(Continued)

(51) Int. Cl.
*H04L 9/40* (2022.01)
*H04L 61/4511* (2022.01)

(52) U.S. Cl.
CPC ...... *H04L 63/1433* (2013.01); *H04L 61/4511* (2022.05); *H04L 63/1408* (2013.01); *H04L 63/1441* (2013.01)

(58) Field of Classification Search
None
See application file for complete search history.

(56) References Cited

U.S. PATENT DOCUMENTS

| 8,145,560 B2 | 3/2012 | Kulkarni et al. |
| 8,844,041 B1 | 9/2014 | Kienzle et al. |
| 9,325,735 B1 | 4/2016 | Xie et al. |

(Continued)

OTHER PUBLICATIONS

Kuhl, M.E., Kistner, J., Costantini, K. and Sudit, M., Dec. 2007, Cyber attack modeling and simulation for network security analysis. In Proceedings of the 39th Conference on Winter Simulation: 40 years! The best is yet to come (pp. 1180-1188). IEEE Press. (Year: 2007).

(Continued)

*Primary Examiner* — James R Turchen
(74) *Attorney, Agent, or Firm* — Fenwick & West LLP

(57) ABSTRACT

An internal network can include a plurality of linked internal nodes, each internal node being configured to communicate with other internal nodes or with one or more external servers over an external network. The internal network can analyze the configuration of the internal nodes and the network traffic between internal nodes of the internal network and external servers. Based on the analysis, a network vulnerability score measuring the vulnerability of the internal network to attack can be determined. If the vulnerability score is below a threshold, the internal network can be isolated from the external network, for example by preventing internal nodes from communicating with or over the external network.

20 Claims, 5 Drawing Sheets

Related U.S. Application Data continuation of application No. 15/272,321, filed on Sep. 21, 2016, now Pat. No. 10,142,364.

(56) References Cited

U.S. PATENT DOCUMENTS

| | | | |
|---|---|---|---|
| 9,338,181 B1* | 5/2016 | Burns | H04L 63/1433 |
| 9,680,852 B1 | 6/2017 | Wager et al. | |
| 9,686,299 B2 | 6/2017 | Stevenson | |
| 9,742,795 B1 | 8/2017 | Radlein et al. | |
| 9,774,611 B1 | 9/2017 | Zipperer et al. | |
| 9,912,686 B2 | 3/2018 | Mahabir et al. | |
| 2005/0050351 A1 | 3/2005 | Cain | |
| 2006/0090196 A1 | 4/2006 | van Bemmel et al. | |
| 2006/0218640 A1 | 9/2006 | Lotem et al. | |
| 2007/0011725 A1 | 1/2007 | Sahay et al. | |
| 2007/0180090 A1 | 8/2007 | Fleischman et al. | |
| 2007/0294376 A1 | 12/2007 | Ayachitula et al. | |
| 2009/0126003 A1 | 5/2009 | Touboul | |
| 2010/0058432 A1 | 3/2010 | Neystadt et al. | |
| 2010/0125662 A1 | 5/2010 | Ou | |
| 2011/0219103 A1 | 9/2011 | Treadwell et al. | |
| 2012/0143650 A1 | 6/2012 | Crowley et al. | |
| 2012/0216239 A1 | 8/2012 | Yadav et al. | |
| 2013/0298244 A1 | 11/2013 | Kumar et al. | |
| 2014/0237545 A1 | 8/2014 | Mylavarapu et al. | |
| 2015/0033340 A1 | 1/2015 | Giokas | |
| 2015/0106889 A1 | 4/2015 | Sharabani et al. | |
| 2015/0207812 A1* | 7/2015 | Back | H04L 63/1408 726/23 |
| 2016/0134653 A1 | 5/2016 | Vallone et al. | |
| 2016/0248794 A1 | 8/2016 | Cam | |
| 2016/0308898 A1 | 10/2016 | Teeple et al. | |
| 2017/0187733 A1 | 6/2017 | Ahn et al. | |
| 2017/0244740 A1 | 8/2017 | Mahabir et al. | |
| 2018/0046811 A1 | 2/2018 | Andriani | |

OTHER PUBLICATIONS

United States Office Action, U.S. Appl. No. 15/272,321, dated Mar. 30, 2018, 11 pages.
United States Office Action, U.S. Appl. No. 16/540,055, dated Apr. 9, 2021, 8 pages.

* cited by examiner

NETWORK ISOLATION BY POLICY COMPLIANCE EVALUATION

CROSS REFERENCE TO RELATED APPLICATIONS

This application is a continuation of U.S. application Ser. No. 16/540,055, filed Aug. 14, 2019, now U.S. Pat. No. 11,075,940, which is a continuation of U.S. application Ser. No. 16/149,144, filed Oct. 2, 2018, now U.S. Pat. No. 10,440,045, which application is a continuation of U.S. application Ser. No. 15/272,321, filed Sep. 21, 2016, now U.S. Pat. No. 10,142,364, all of which are incorporated by reference in their entirety.

FIELD OF ART

This application relates generally to the field of networking, and more specifically to techniques for network isolation based on an evaluation of a network's vulnerability based on policies applied to nodes of the network.

BACKGROUND

Many challenges exist in administrating a network of computing systems ("nodes"), particularly networks with hundreds, thousands, or more nodes. Complicating network management further is the potentially large variance in node operating systems, hardware configurations, software configurations, networking configurations, and the like. For instance, two nodes in the same network can include different versions of the same program, different programs, different hot fixes, and different operating systems. As used herein, a node's hardware configuration, operating system configuration, software configuration, network configuration, and other properties or characteristics is referred to collectively as a "node configuration" or simply "configuration". To provide a consistent standard for monitoring, maintaining, and configuring individual nodes within the network, a network administrator may devise one or more network node policies to govern the configuration of nodes within the network. The policies may include specific requirements relating to the configuration and operation of each node in the network. Assessing the vulnerability of such a network to attack can be inefficient or impractical. Accordingly, there is a need for a system to measure and manage the vulnerability of the network to attack.

SUMMARY

An internal network can include a plurality of linked internal nodes, each internal node being configured to communicate with other internal nodes or with one or more external servers over an external network. Each internal node can contain a node configuration that determines how the internal node interacts with other internal nodes and external servers. The internal network can, for example via an operator node of the internal network, analyze the configuration of the internal nodes and network traffic between internal nodes of the internal network and external servers. Based on the analysis, a network vulnerability score measuring the vulnerability of the internal network to attack can be determined. If the vulnerability score is below a threshold, the internal network can be isolated from the external network, for example by preventing internal nodes of the internal network from communicating over the external network. While the network is isolated, the configuration of the internal nodes can be updated to reduce the vulnerability of the network to attack. To reverse the isolation of the network, external network traffic can be simulated within the internal network, and a simulated network vulnerability score can be calculated. If the simulated vulnerability score returns to above the vulnerability threshold, the isolation of the internal network can be reversed.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Networking Environment

Figure 1:
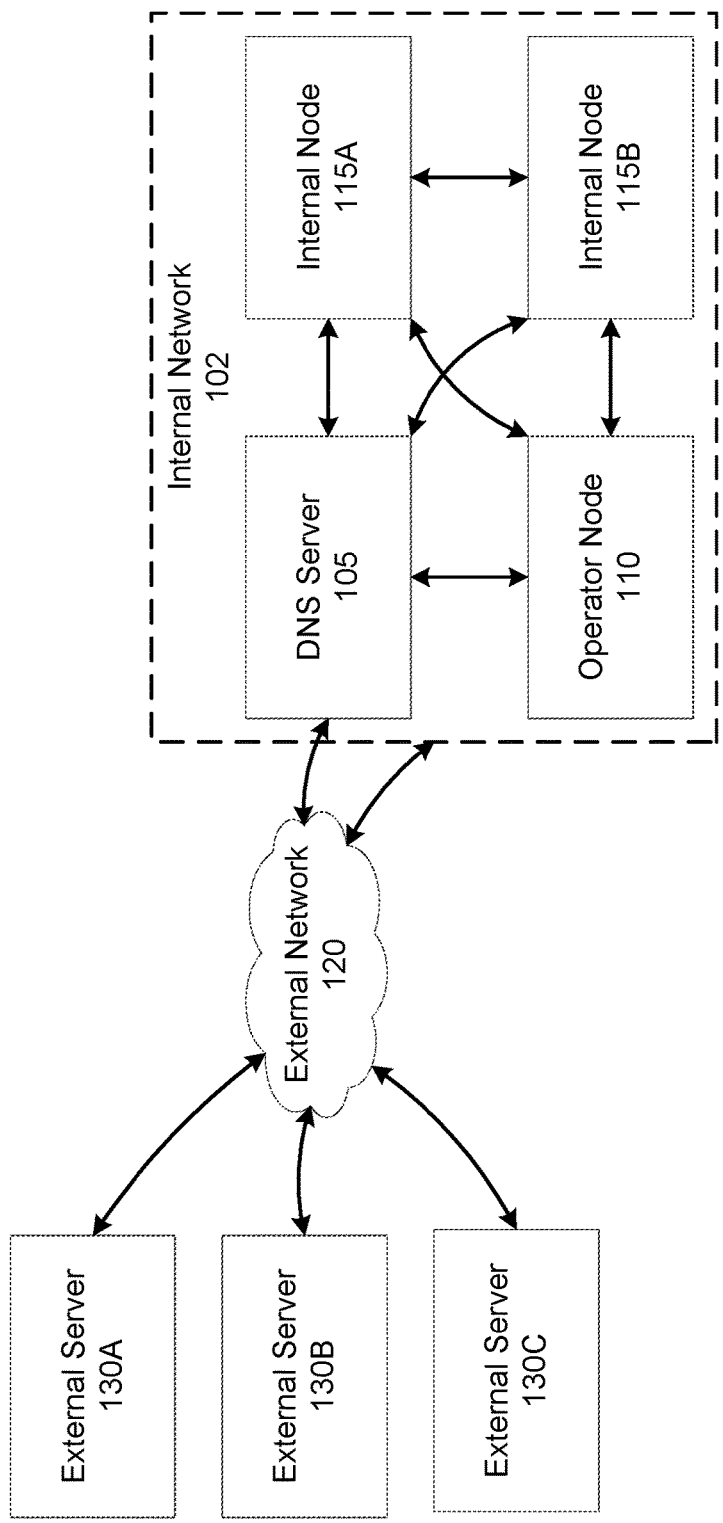
FIG. 1 is a block diagram illustrating a networking environment, according to one embodiment.

FIG. 1 is a block diagram illustrating a networking environment, according to one embodiment. The networking environment 100 of FIG. 1 includes an internal network 102 with a DNS server 105, operator node 110, and internal nodes 115A and 115B, an external network 120, and external servers 130A-130C. It should be noted that in alternative embodiments, the environment of FIG. 1 can include additional, fewer, or different components than those illustrated in FIG. 1. For instance, alternative embodiments can include any number of internal nodes 115 (from as few as one internal node to hundreds or thousands or more internal nodes).

The internal network 102 can be a network of nodes administered by, connected to, or associated with a single entity, such as an individual, business, or government agency. For example, an internal network can be a personal network, corporate network, or the like. In some embodiments, the DNS server 105, operator node 110, and internal nodes 115 collectively form the internal network 102, which is connected to the external network 120. In some embodiments inbound and outbound DNS services for the internal network 102 are handled by the DNS server 105. Similarly, inbound and outbound network traffic of the internal server can be handled by a router or other suitable node of the internal network 102. In some embodiments, a router for the internal network 102 can be integrated with the DNS server 105 of the internal network. The internal network 102 can be any suitable network, such as a LAN, a MAN, a WAN, a mobile wired or wireless network, a private network, a virtual private network, a direct communication line, or the like. In other embodiments, an internal network 102 can include more, fewer, or differently connected internal nodes 115.

Each node (for example, the operator node 110 or an internal node 115) of the internal network 102 is a computing system capable of transmitting or receiving data over a network (for example the internal network 102 or the external network 120). Examples of nodes include but are not limited to personal computers, laptop computers, server computers, mobile devices (such as tablet computers or mobile phones), specialized computers or systems (such as medical computing systems, financial computing systems, databases, and the like), network computing systems (such as routers, switches, firewall computing systems, and the like), web service endpoints, databases, or any other suitable computing system.

In some embodiments, each node includes a node configuration describing one or more properties or characteristics of the node, for instance the hardware configuration of the node (such as the identity, type, brand, properties, or capabilities of one or more hardware components or mounts of the node), the software configuration of the node (such as the identity or version of one or more applications installed on the node, patches or hot fixes installed on the node, files stored at the node, application settings or configurations, scheduled tasks, groups to which the node belongs, packages or services installed at or corresponding to the node, inventory items corresponding to the node, registry keys corresponding to the node, and the like), the operating system configuration of the node (such as the identity or version of the operating system, the identity or version of operating system patches or components, operating system services, operating system configurations or settings, and the like), the networking configuration of the node (such as ports, network interfaces, environment variables, routes, one or more node communicative configurations or settings, one or more security configurations or settings, access control lists or "ACLs" corresponding to the node, and the like), and properties or characteristics corresponding to one or more users of the node. As used herein, each property or characteristic of a node is referred to as a "node object", "node attribute", or simply an "attribute". In some embodiments used herein, node objects or node attributes are limited to node software or firmware components, such as applications, patches, hot fixes, files, drivers, and the like.

Similarly, each node can have one or more implemented policies affecting the node configuration of the node. As used herein, "policy" can refer to an identification of a node configuration and/or one or more node objects. Further, a policy can include a set of tests to test for the presence or absence of the identified node configuration on one or more nodes, or the presence or absence of a specifically configured node. As used herein, the generation of a node policy refers to the creation of a policy based on an identified or selected node configuration and/or node. As used herein, the implementation of a node policy refers to the application of the node policy to a node to identify compliance with the node policy, for instance to determine if the node includes a node configuration and/or node objects identified by the node policy. The implementation of a node policy can further include the configuration of a node based on the node policy, for instance by configuring the node into a node configuration identified by the node policy, and/or to install one or more node objects identified by the node policy. It should be noted that in some embodiments, a node policy can identify a node configuration and/or node objects to exclude. For instance, a policy can identify a software patch to exclude, and implementing such a policy can involve testing for the absence of the identified patch and/or the removal of the identified patch.

The internal nodes 115 are capable of communicating with other nodes of the internal network 102. For example, the internal node 115A can communicate with the internal node 115B, the operator node 110, or the DNS server 105 over the internal network. In some embodiments, DNS services for any communication between an internal node 115 and an external server 130 over the external network 120 are handled by the DNS server 105. Similarly, network traffic between an internal node 115 and the external network 120 can be routed through a router or network switch of the internal network 102.

The DNS server 105 is a computing system capable of transmitting or receiving data over a network (for example the external network 120 or the internal network 102) and configured to act as a Domain Name System (DNS) server for the internal network 102. Similarly, the DNS server 105 can be configured to handle DNS resolution for the internal network. In some implementations, the DNS server 105 is integrated into an internal node 115 of the internal network 102, but the DNS server can also be located on a separate server distinct form the internal network, according to other implementations.

In some embodiments, the DNS server 105 can control network traffic to and from the other nodes of the internal network (such as internal nodes 115A and 115B and the operator node 110), for example based on instruction from the operator node 110. The DNS server 105 can allow or prevent both internal and external requests for DNS resolution. As DNS resolution is required to correctly route network traffic, the DNS server can, in this manner, prevent inbound and outbound network traffic traveling to and from the internal network 102. For example, the DNS server 105 can close TCP (transmission control protocol) and UDP (user data protocol) ports, such as port 53, and can flush the DNS cache to prevent the resolution of DNS requests for inbound and outbound network traffic of the internal network 102. In some implementations, the DNS server 105 can prevent completion of some DNS requests to and from specific internal nodes 115 or external servers 130 while allowing other DNS requests to resolve normally. In other words, the DNS server 105 can effectively isolate all or part of the internal network 102 by preventing traffic to and from nodes of the internal network.

The operator node 110 is a node of the internal network 102 configured to calculate a network vulnerability score. The network vulnerability score can indicate the current state of the configuration of the internal network 102. In some implementations, the network vulnerability score can give an indication of the internal network's vulnerability to attack. The calculation of a network vulnerability score will be discussed further below. Similarly, the network vulnerability score reflects the level of compliance of the network with respect to one or more network configuration policies of the network.

In some implementations, the operator node 110 takes action to affect the operation or configuration of the internal network 102 based on the calculated network vulnerability score. For example, the operator node 110 can cause the internal network 102 to be isolated form the external network 120 based on the calculated network vulnerability score falling below a set threshold value. In some embodiments, the operator node 110 isolates the network by identifying all or a portion of the internal network 102 to the DNS server 105 and issuing a network isolation command for the identified all or portion of the internal network to the DNS server. However, the network can be isolated by any suitable method, for example by completely disconnecting the internal network from the external network 120 such as through altering the configuration of a router or network switch of the internal network 102. In some embodiments, the operator node 110 is integrated with the DNS server, but, as in the embodiment of FIG. 1, the operator node 110 can also be a separate node of the internal network 102. The operator node 110 will be discussed further in relation to FIG. 2.

The external network 120 can be any suitable network, such as the Internet, a LAN, a MAN, a WAN, a mobile wired or wireless network, a private network, a virtual private network, a direct communication line, and the like. The external network 120 can also be a combination of multiple different networks of the same or different types. In some implementations, the network 120 can connect one or more external servers 130 to the DNS server 105, another internal node of the internal network 102, a router of the internal network, or the like. For example, this allows internal nodes 115 to communicate with the external servers 130.

An external server 130, such as the external servers 130A, 130B, and 130C, is a computing system capable of transmitting or receiving data over the external network 120. In some implementations, an external server 130 is capable of communicating with the internal network 102 via the external network 120. Similarly, DNS requests for nodes of the internal network 102 from an external server 130 can be directed to the DNS server 105.

Network Policy Enforcement

Figure 2:
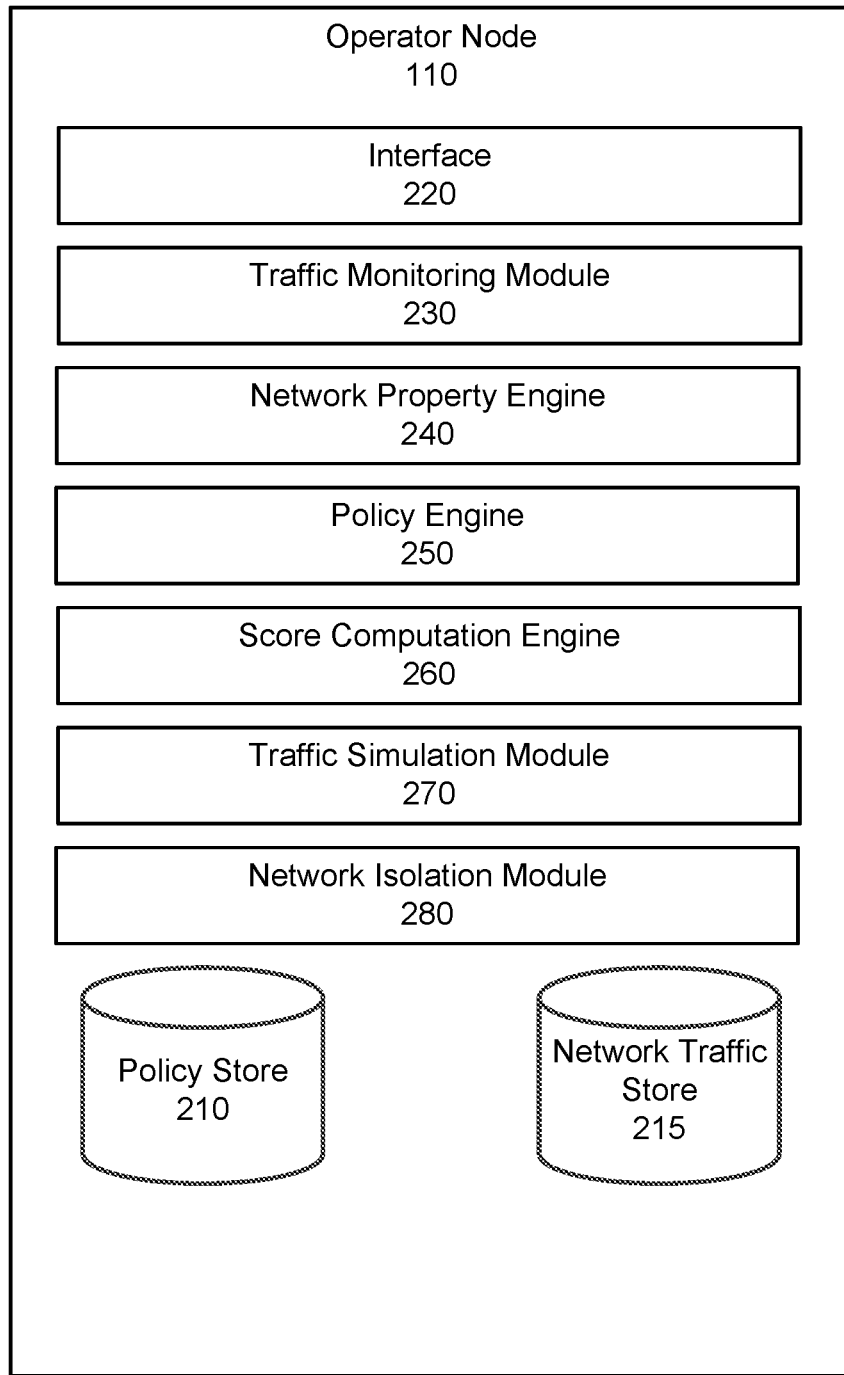
FIG. 2 is a block diagram illustrating an example operator node of a network, according to one embodiment.

FIG. 2 is a block diagram illustrating an example operator node of a network, according to one embodiment. The operator node 110 includes a policy store 210, a network traffic store 215, an interface 220, a traffic monitoring module 230, a network property engine 240, a policy engine 250, a score computation engine 260, a traffic simulation module 270, and a network isolation module 280.

The policy store 210 can store one or more policies able to be implemented on the internal network. For example, the policy store 210 can store a set of policies with which one or more nodes of the internal network 102 or the internal network itself is required to comply. In some embodiments, the policy store 210 stores policies compatible with the internal network 102, but not currently implemented on the internal network. In some implementations, policies stored in the policy store 210 can be implemented on the internal network by other modules of the operator node 110, such as the external policy engine 240 or the internal policy engine 250.

The network traffic store 215 can store logged internal and external network traffic information of the internal network 102. For example, network traffic captured by the traffic monitoring module 230 can be stored in the network traffic store 215. The network traffic store 215 can store logged DNS requests to the DNS server 205, including both outbound DNS requests from internal nodes and inbound DNS requests from external servers 130. According to some embodiments, inbound and outbound DNS requests can be logged by the DNS server 205 and stored in the network traffic store 215. In some embodiments, stored network traffic information is later used by the traffic simulation module 270 to simulate incoming and outgoing network traffic to and from the internal network and/or one or more nodes of the internal network as described below.

The interface module 220 provides a communicative interface between the operator node 110, the other nodes of the internal network, and the DNS server 105. For example, the interface module 220 can allow the operator node 110 to communicate with the internal nodes 115A and 115B or the DNS server 105. In some implementations, the interface module 220 also allows the operator node 220 to communicate with a user. The interface module 220 requests information (such as configuration information) from the nodes of the internal network, for instance in response to a request by the external configuration engine 240. The interface module 220 receives the requested information, and provides it to one or more other modules or displays it, for instance to a user of the operator node 110. The interface module 220 can provide a policy to a node of the internal network, can provide requests to a node to configure the node according to the policy, and can generate one or more user interfaces to display policy or configuration information. The interface module 220 can receive input from a user, can provide received inputs to one or more other modules of the operator node or a node of the internal network, and can store policy information and network traffic information (for instance in the policy store 210 or the network traffic store 215, respectively).

In some embodiments, the traffic monitoring module 230 logs and stores data about inbound and outbound network traffic of the internal network 102. For example, the traffic monitoring module 230 can log inbound and outbound DNS requests to and from the DNS server 105, or receive and store such logs in the network traffic store 215. Similarly, the traffic monitoring module 230 can monitor any suitable network traffic of the internal network 102, and can store network traffic data in the network traffic store 215. For example, data about network traffic passing through a router of the internal network 102 can be monitored and logged by the traffic monitoring module 230.

Network Properties

According to some embodiments, the network property engine 240 measures and manages the configuration of the internal network 102 with respect to one or more network properties. A network property can be a factor or indicator of the vulnerability of the internal network to attack, either directly or indirectly. Network properties can be determined based on an analysis of the internal network's configuration when communicating with the external network 120. For example, the level of encryption of traffic between the internal network and external servers can be a network property which directly indicates a level of vulnerability to attack. Similarly, historical data about past vulnerabilities or data breaches of the internal network 102 can be an network property which indirectly indicates the level of vulnerability of the internal network. In some embodiments, network properties can indicate the internal network's response to an attack, for example based on the internal configuration and policies of the internal network 102. For example, the existence of an unplanned change in configuration of the internal network can be a network property which directly indicates a vulnerability to attack or an attack in progress. Similarly, the level to which the operator node 110 is able to monitor the internal network 102 can be a network property which indirectly indicates the level of vulnerability of the internal network to attack. In some implementations, a network property can be associated with one or more policies able to be implemented on the internal network 102. For example, policies associated with an network property can configure nodes of the internal network 102 to manage the vulnerability of the internal network with respect to that network property. The network property engine 240 can measure each network property using historical information, current configuration information of one or more nodes of the internal network, or any other suitable information. In some embodiments, measurement of the network properties is halted if the internal network 102 is isolated from the external factors 103. Because measurement of certain network properties relies upon analysis or monitoring of network traffic between the internal network 102 and the external network 120, effective calculation of those network properties can be influenced when the internal network 102 is isolated. The measured vulnerability of a network property can be represented by a points based score, a percentile score, a binary score (e.g. acceptable or non-acceptable), classification into a vulnerability category, or any other suitable scoring or rating method. In some implementations, each network property is associated with a specific scoring method used to evaluate that network property.

In some implementations, the network property engine 240 can instruct the policy engine 250 to add, alter, replace, or remove policies to manage the vulnerability of the internal network to the network properties. For example, the network property engine 240 can request the implementation of one or more policies associated with a network property to further mitigate network vulnerability associated with that network property. In some embodiments, the network property engine 240 requests implementation or alteration of policies based on the instructions from the score computation engine 260, for example, based on the score computation engine's calculation of a network vulnerability score.

Example Network Properties

An "encryption" network property can comprise a measure of the use and strength of encryption protocols (if any) encrypting data of the internal network 102 and communications between nodes of the internal network and between the internal network and external servers 130. For example, an internal network using TLS (Transport Layer Security) and encrypted cookies can be associated with less measured vulnerability than an internal network using a deprecated version of SSL (Secure Sockets Layer) and no other encryption. In some embodiments, an encryption network property can be associated with a points based scoring system, where encryption in an area is weighted with a point value based on the strength of the encryption and a lack of encryption in an area (for example, no encryption of data stored on the internal network) is weighted with negative points. The encryption network property can be associated with policies controlling the implementation of encryption protocols on the internal network 102.

An "expiration date" network property can measure the expiration status and remaining time to expiry of time-limited elements of the internal network. For example, an expiration date network property can take into account the expiration status of certificates or encryption keys associated with the internal network 102, as well as the proximity of the certificates or expiration keys to expiring. Unexpired or recently renewed certificates can be preferred to expired or close-to-expired certificates and the measurement of the expiration date network property can reflect this preference. In some embodiments, the expiration date network property can also take into account a rate or frequency at which the certificates associated with the internal network 120 are renewed. In some embodiments, an internal network can be configured to constantly renew certificates with extremely low durations. The expiration date network property can be associated with policies configuring the use and renewal of certificates and encryption keys on the internal network 102.

An "exposed server info" network property can measure the amount of information about the internal network 102 that is exposed to external servers 130 communicating with the internal network. For example, openly available server headers of an internal node 115 of the internal network 102 can contain version information or other information about the configuration about the node. An exposed server info network property can measure this and other exposed configuration information about the internal network 102. The exposed server info network property can be associated with policies controlling the availability of server configuration information of the internal network 102. For example, the exposed server info network property can be associated with a policy configuring server headers of nodes of the internal network 102, for example to not contain version information.

An "authenticity check" network property can measure the ability of the internal network 102 to detect inauthentic communications, for example, "spoofed" network traffic or emails. In some embodiments, the authenticity check network property measures the use and configuration of suitable authentication protocols on the internal network 102. For example, the internal network 102 can the DMARC (Domain-based Message Authentication, Reporting & Conformance), SPF (Sender Policy Framework), and DKIM (DomainKeys Identified Mail) protocols to authenticate incoming emails, the DNSSEC (Domain Name System Security Extensions) suite to validate DNS responses, and any other suitable protocols. The authentication protocols can be used to detect spoofed communications. The authenticity check network property can be associated with one more policies configuring suitable authentication protocols on nodes of the internal network 102.

According to some implementations, a "port accessibility" network property measures network vulnerability due to open ports of the internal nodes 115. The port accessibility network property can weigh the accessible ports for each of the internal nodes 115 based on the functionality of that internal node. For example, an open port 1433 or 3306 (used for SQL or MySQL databases) on an internal node 115 functioning as a database server can be weighted less heavily than a different internal node 115 with the same open ports not expected to interact with those ports. The port accessibility network property can be associated with one or more policies configuring port accessibility of the internal nodes 115.

A "sentiment" network property can measure a level of satisfaction of among operators of the internal network 102. Low satisfaction among, for example, employees of an operator of the internal network can result in a higher vulnerability of a breach. For example the sentiment network property can take into account, employee satisfaction, CEO approval ratings, and a churn or replacement rate of employees with access to the internal network 102.

A "data breach history" network property takes into account a history and severity of previous breaches to the internal network 102. For example, the data breach history network property can be calculated based on a number of times the internal network has been previously breached. The weighting of each data breach in the calculation of the data breach history network property can be based on a severity of the breach and a length of time since the breach occurred.

In some implementations, the internal network 102 can interact with one or more vendors that provide various services to the internal network 102. A "vendor frequency" network property can measure the security of the vendors used by the internal network 102 based on the frequency at which the vendors update their services.

A "blacklisted sites" network property can be based on whether one or more IP addresses recently accessed by an internal node 115 has been blacklisted. Similarly, a "target attractiveness" network property can measure how profitable a target the internal network 102 is to an unauthorized or malicious entity.

A "configuration compliance" network property can measure the integrity and results of internal testing of the configuration of the internal network 102. For example, the frequency and results of internal performance and security testing can be captured by the configuration compliance network property. Similarly, the compliance of the internal nodes 115 with the policies of the internal network 102 can be measured by the configuration compliance network property. The configuration compliance network property can be associated with one or more policies governing internal testing of the internal network 102.

A "change integrity" network property can measure an amount of unplanned changes occurring on the internal network 102 and a variance in configuration of the internal nodes 115. Unplanned changes in the configuration of nodes of the internal network 102 can indicate a security breach or poor configuration of internal nodes 115. In some embodiment, the internal configuration engine 245 can coordinate with a $3^{rd}$ party change validation service to determine if changes to the internal network 102 are not malicious. These results can be incorporated into the change integrity network property. The change integrity network property can be associated with policies configuring change permissions and the use of third party change validation services on the internal network 102.

In some embodiments, a "known vulnerability" network property can measure the amount and severity of known vulnerabilities in the internal network 102. For example, third party software or protocols used by the internal network 102 can have known but uncorrected security vulnerabilities that have yet to be patched by the distributor of the third party software. The known vulnerability network property can be associated with policies configuring the use of third party software on the internal network.

A "network discovery" network property can measure the ability of the operator node 110 to analyze the configuration of every internal node 115 of the internal network 102. In some embodiments, the operator node 110 cannot access or modify the configuration of certain internal nodes 115 of the internal network. The network discovery network property can reflect the overall level of information the operator node 110 can access about the configuration and communication of the internal network 102.

In some implementations, a "vendor management" network property can be determined based on the risk and reputability associated with vendors utilized by the internal network 102. In some embodiments, each vendor is associated with a vendor risk profile which is incorporated into the vendor management network property. The vendor management network property can be associated with policies controlling the internal network 102's use of third party vendors.

An "industry and function" network property can incorporate information about the function of the internal network 102 and the sector or industry that the operator of the internal network is a part of. This can indirectly affect the attractiveness of the internal network 102 to attack, and can therefore be incorporated into the industry and function network property.

The policy engine 250 generates and/or implements a node policy for one or more internal nodes 115. The policy engine 250 identifies, for one or more internal nodes 115, a node configuration of each node and/or node objects installed at each node. The policy engine creates a policy based on one or more of: a node configuration, node objects installed at each node, user input identifying one or more objects to include within the policy, a role of a user, or any other suitable information. For instance, the policy engine can identify a set of objects installed at the node (such as software components, hot fixes, patches, and files), can display the identified set of objects to a user, and can receive a selection of a subset of the objects by the user. The policy engine can then generate a policy identifying the selected subset of objects. The policy can be stored in the policy store 210 for subsequent use and implementation. It should be noted that in some embodiments, the policy engine can generate a policy without identifying a node configuration or objects stored at a node. For example, a user of the operator node 110 can select a node configuration or node objects from a pre-generated list of objects presented by the policy engine via the interface module, and can generate a policy based on the selected node configuration or node objects.

The score computation engine 260 calculates a network vulnerability score based on the network properties measured by the network property engine 240. As mentioned above, the network vulnerability score can measure the vulnerability level of the internal network 102 to an attack. A network vulnerability score can be calculated based on a weighted combination of the network properties. In some implementations, the weight given to each of network properties in the weighted combination is based on the type of property, level of importance of the property, and the method of measurement of the property. For example, an encryption network property can be weighed higher than an expiration date network property if the encryption of the internal network 102 is considered more important to the security of the internal network 102 than the expiration status of certificates associated with the internal network 102. In some embodiments, network properties measuring the internal network 102's vulnerability to attack can be weighted more heavily than network properties measuring the internal network's internal practices or capability to detect or respond to an attack, while in other embodiments, the network properties can be weighted according to system operator preference or any other suitable metric. A network vulnerability score can be calculated as a score out of 100 indicating the vulnerability of the internal network 102 to attack, where a low score indicates a greater vulnerability to attack than a high score. In other embodiments, the network vulnerability score can be calculated as a points based score (where greater points indicate less vulnerability to attack), a percentile score, a classification into an overall vulnerability category, or any other suitable method. In some implementations, the network vulnerability score is calculated periodically, for example every ten seconds or every second. In other implementations, the network vulnerability score is calculated substantially in real-time.

For example, a network vulnerability score can be calculated based on an encryption network property with a current value of 8 out of 10, an expiration date network property with a current value of 2 out of 10, and a compliance network property with a current value of 7 out of 10. In this example, the network vulnerability score is a points based score calculated as a weighted combination of the network properties. In this example, the encryption network property is assigned a weight coefficient of 0.5, the expiration date network property is assigned a weight coefficient of 0.3, and the compliance network property is assigned a weight of 0.2. Based on these network properties and weights, the resulting network vulnerability score is 6 according to this example. In other embodiments, the network vulnerability score can be calculated based on any suitable subset of network properties, for example, of the network properties measured by the network property engine 240.

In some embodiments, the score computation engine 260 can instruct the network isolation module 280 to isolate the network in response to the network vulnerability score falling below a set vulnerability threshold. The vulnerability threshold can represent a maximum level of vulnerability at which the internal network 102 can operate before the internal network is isolated from the external network. In some implementations, a vulnerability threshold is set by an operator of the internal network 102, but the vulnerability threshold can also be determined procedurally or by any other suitable manner. When the score computation engine 260 determines that the network vulnerability score is below the vulnerability threshold, a grace period, for example of ten seconds, can begin. If the network vulnerability score remains below the threshold after the grace period has expired, the score computation engine 260 can instruct the network isolation module 280 to isolate the internal network. This grace period can prevent instances where the internal network is isolated based on a momentary fluctuation of the network vulnerability score. In other embodiments, the internal network 102 can be isolated based on a rolling average of calculated network vulnerability scores, for example incorporating the 10 latest network vulnerability scores, falling below the vulnerability threshold.

After the internal network is isolated 102, the score computation engine 260 can determine when to reverse the isolation of the internal network. In some embodiments, the length of time of a network isolation is predetermined. After the threshold amount of time has passed, the score computation module 260 can instruct the network isolation module 280 to reverse the isolation. The internal network 102 can be isolated for an increasing amount of time each successive time the internal network is isolated. For example, the internal network 102 can first be isolated for 1 minute, then 1 hour, and finally, isolated until an operator of the internal network manually reverses the isolation. In some embodiments, the network isolation can be reversed based on policy or configuration changes made to nodes of the internal network 102 after the network isolation. For example, the network isolation can be reversed in response to new up-to-date certificates for the internal network being received. In some embodiments, the score computation engine 260 can instruct the external configuration engine 240 and the internal configuration engine 245 to add or change policies based on the vulnerability score, or a user or system operator can manually change policies in response to being presented with the vulnerability score.

In some implementations, a network isolation can be reversed based on a calculated simulated network vulnerability score being above the vulnerability threshold. A simulated network vulnerability score is calculated based on stored or recreated network traffic data in the same manner as the network vulnerability score is calculated. In response to a network isolation, a simulated network vulnerability score can be calculated, and if the network isolation can be reversed in response to the simulated network vulnerability score being above the vulnerability threshold. In some embodiments, a separate threshold is used to determine if the isolation of the internal network 102 should be reversed.

According to some embodiments, the traffic simulation module 270 can recreate or simulate network activity between the internal network 102 and the external network 120. The traffic simulation module 270 can recreate or simulate historical network traffic to the internal network 102 while the internal network is isolated. For example, this enables a simulated network vulnerability score to be calculated while the network is isolated, for instance based on an updated configuration of one or more internal network nodes. Network activity can be simulated based on logged network activity data from the network traffic store 215. For example, logged DNS request data and other network traffic logs stored in the network traffic store 215 can be used to simulate the network traffic that occurred at a given time. For example, while the internal network 102 is isolated, network traffic data from shortly before the isolation occurred can be used to recreate the circumstances in which the internal network 102 was isolated. The simulated network vulnerability score can then be used to determine if the isolation of the internal network 102 can be reversed, for instance if the simulation of the network traffic in view of the updated configuration of one or more internal nodes results in a vulnerability score that exceeds a vulnerability score threshold, and can restore the network to full connectivity with the external network 120 without unacceptable vulnerability.

The network isolation module 280 can isolate the internal network 102 from communication over the external network 120, or in general with communication outside of the internal network. In some implementations, the network isolation module 280 can send a network isolation command to the DNS server 105. The network isolation module 280 can isolate the internal network 102 by any suitable method. For example, the network isolation command can instruct the DNS server 105 to isolate the internal network 102 by interrupting DNS services for inbound and outbound traffic to and from the internal network. In other embodiments, the network isolation module 280 can instruct a router or similar network communication device of the internal network 102 to interrupt the communicative connection between the internal network 102 and the external network 120, for example by shutting down a router or access point relaying network traffic between the internal network 102 and the external network 120. In some embodiments, the network isolation module 280 identifies a portion of the internal network 102, such as one or more internal nodes, and isolates the portion of the internal network while retaining connectivity for the remainder of the internal network. In such embodiments, the network isolation module 280 can identify nodes within the internal network responsible for an unacceptable change in vulnerability score (for instance, due to the configuration of the nodes), and can isolate only the identified nodes.

Figure 3:
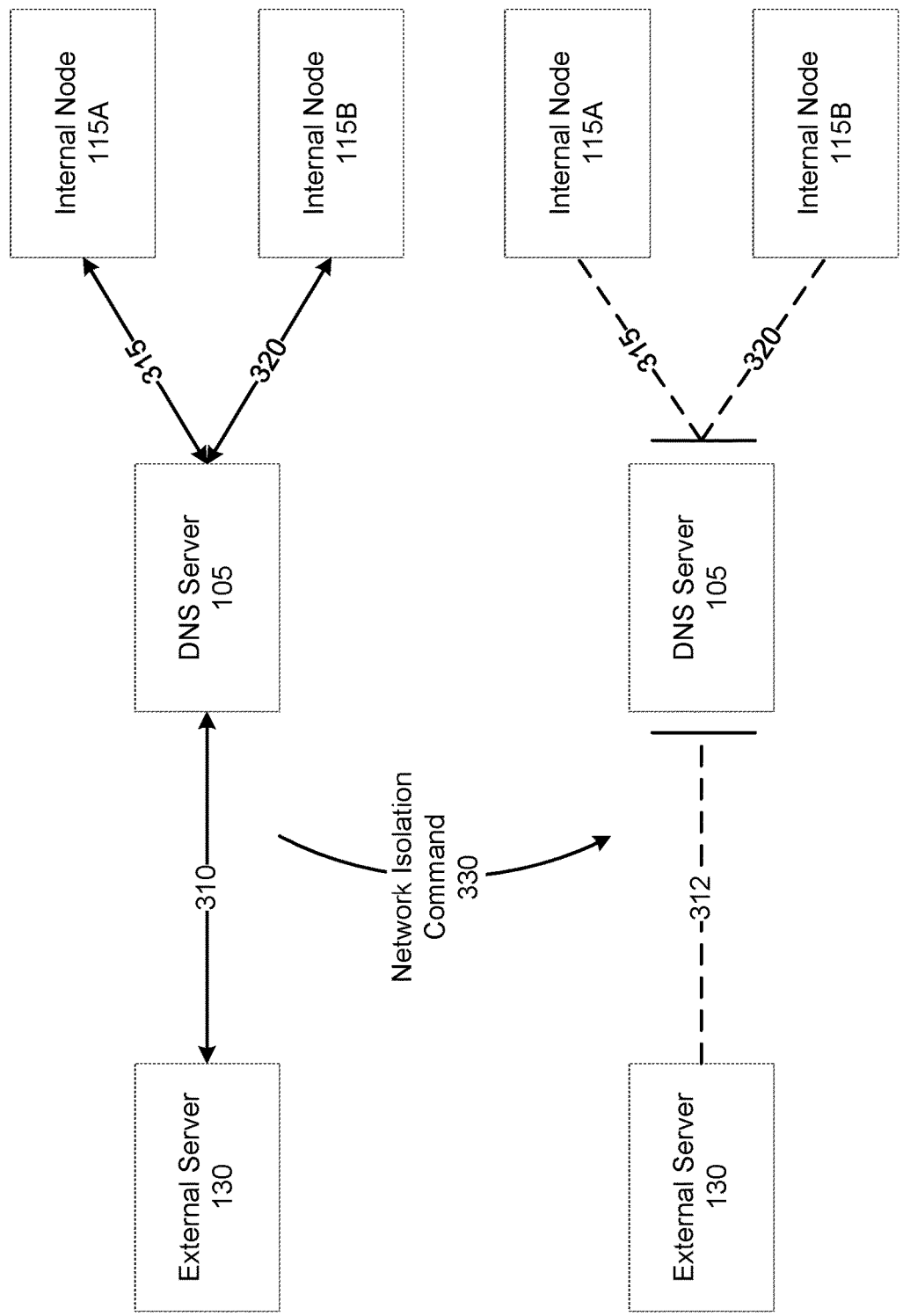
FIG. 3 is a diagram illustrating a network isolation command being applied to a network, according to one embodiment.

FIG. 3 is a diagram illustrating a network isolation command being applied to a network, according to one embodiment. The diagram 300 depicts the interactions between an external server 130, DNS server 105, and internal nodes 115A and 115B, before and after a network isolation command 330 is issued. In the embodiment FIG. 3, the DNS server 105 functions as the DNS server of the internal network 102.

Prior to the network isolation command 330, the external server 130 sends DNS requests 310 to the DNS server 105, for example to connect to an internal node 115A of the internal network 102. The DNS server 105 can in turn transmit a response 310 to the external server 130 containing the requested IP address information. Similarly, the internal nodes 115A and 115B can send DNS requests 315 and 320 to the DNS server 105 and receive IP address information in return.

After the network isolation command 330, the internal network 102, including the internal nodes 115A and 115B is isolated from the external network, which includes the external server 130. In this embodiment, when the external server 130 sends a DNS request to the DNS server 105, the DNS request is received by the DNS server, but due to the network isolation command, no response is sent from the DNS server in return. Instead, the DNS request can be logged, for example for later use in calculating a simulated network vulnerability score. As the external server 130 relies on the DNS server 105 to provide the correct IP address for network traffic to the internal network 102, in the absence of this information, the internal network 102 is effectively isolated from traffic from the external server 130. Similarly, DNS requests from the internal nodes 115A and 115B are received by the DNS server 105, but no response is sent in return. Therefore, the internal network 102 is isolated from the external network 120. Outbound DNS requests 315 and 320 may be logged similarly to the inbound DNS requests 312. To reverse the isolation of the internal network 102, the DNS server 105 can be instructed to return to normal operation as a DNS server, restoring full connectivity to the internal network 102.

Network Vulnerability Score

Figure 4:
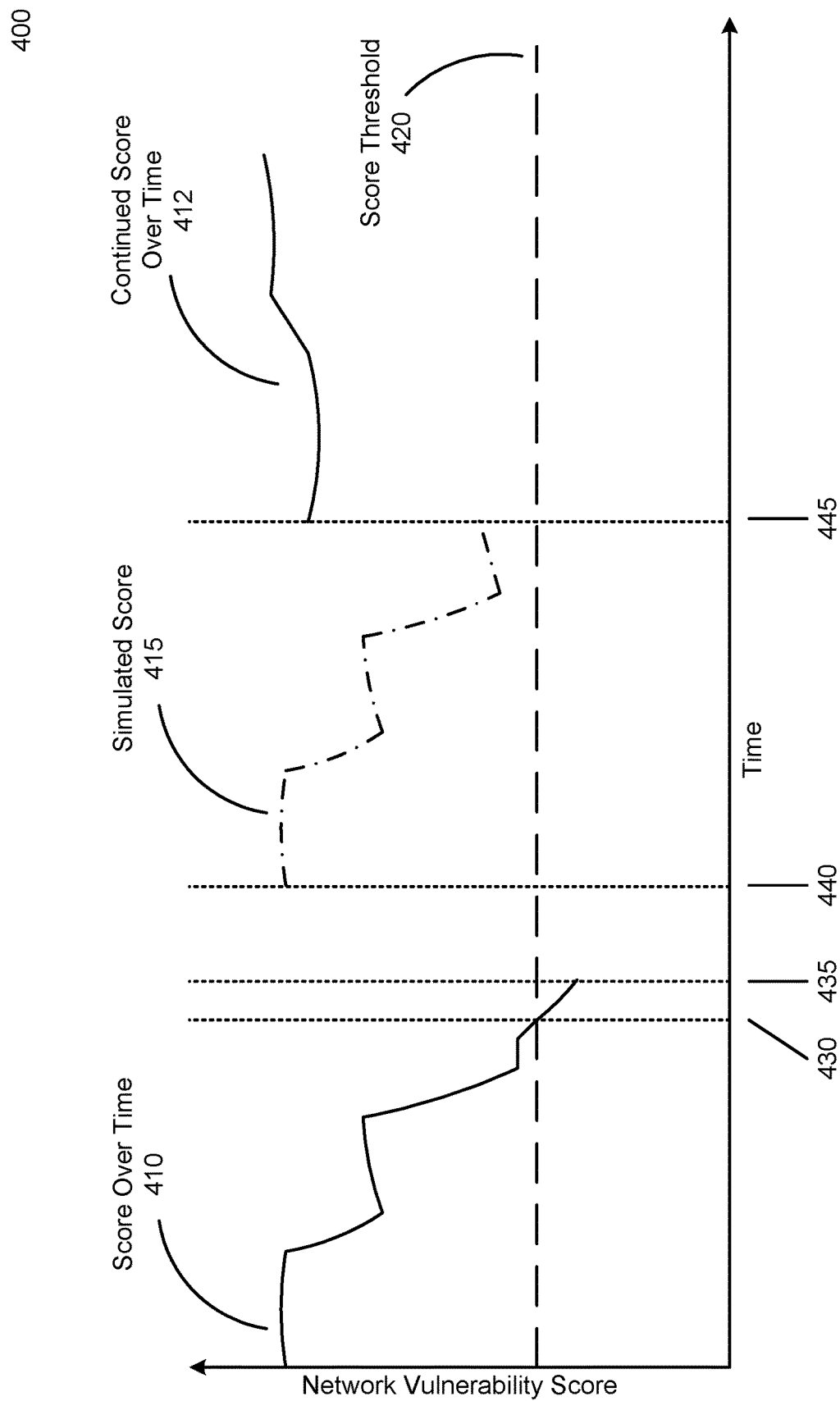
FIG. 4 is a graph of an example network vulnerability score over time, according to one embodiment.

FIG. 4 is a graph of an example network vulnerability score over time, according to one embodiment. The graph 400 shows a network vulnerability score graphed over time, represented initially by the score 410. Prior to the time 430, the score 410 shows a routine calculation of the network vulnerability score and routine operation of the operator node 110 and internal network. That is, prior to the time 430 the score 410 is above the score threshold 420, and no action is taken by the operator node 110 to isolate the internal network. In some implementations, when the network vulnerability score drops below the score threshold 420 action is taken to isolate the internal network.

At the time 430, the score 410 drops below the score threshold 420. In this embodiment, a set grace period begins before the network is isolated begins at the time 430. If the network vulnerability score is still below the threshold 420 after the grace period has elapsed, the operator node 110 will isolate the internal network. At the time 435 the grace period has elapsed and the internal network is isolated. In the embodiment of FIG. 4, computation of the network vulnerability score is halted at the time 435 when the internal network is isolated.

In some implementations, from the time 435 to the time 440 the configuration of the internal network is updated, for example by changing one or more policies of the internal network. At the time 440, calculation of a simulated score 415 begins. The simulated score 415 can be the result of a network vulnerability score calculation applied to the internal network using placeholder, historical, or recreated network traffic data, while the internal network remains isolated. In this implementation, the simulated score 415 is calculated using historical network traffic data (for example logged network traffic data) from the time period immediately prior to the network isolation command being issued. For example, the simulated score 415 can be calculated using network traffic data from the time period up to the time 430. If the enacted configuration changes to the internal network were successful in mitigating the vulnerability of the internal network to attack, the connectivity between the internal network and the network 120 can be restored. For example, if the simulated score does not drop below the score threshold 420 in the situations where the score over time 410 previously dropped below the score threshold, the internal network can be reconnected to the network 120. In the embodiment of FIG. 4, the simulated score 415 does not drop below the score threshold 420 and the internal network is reconnected to the network 120, and therefore at the time 445, the score over time calculation is continued 412.

Process for Policy Enforcement

Figure 5:
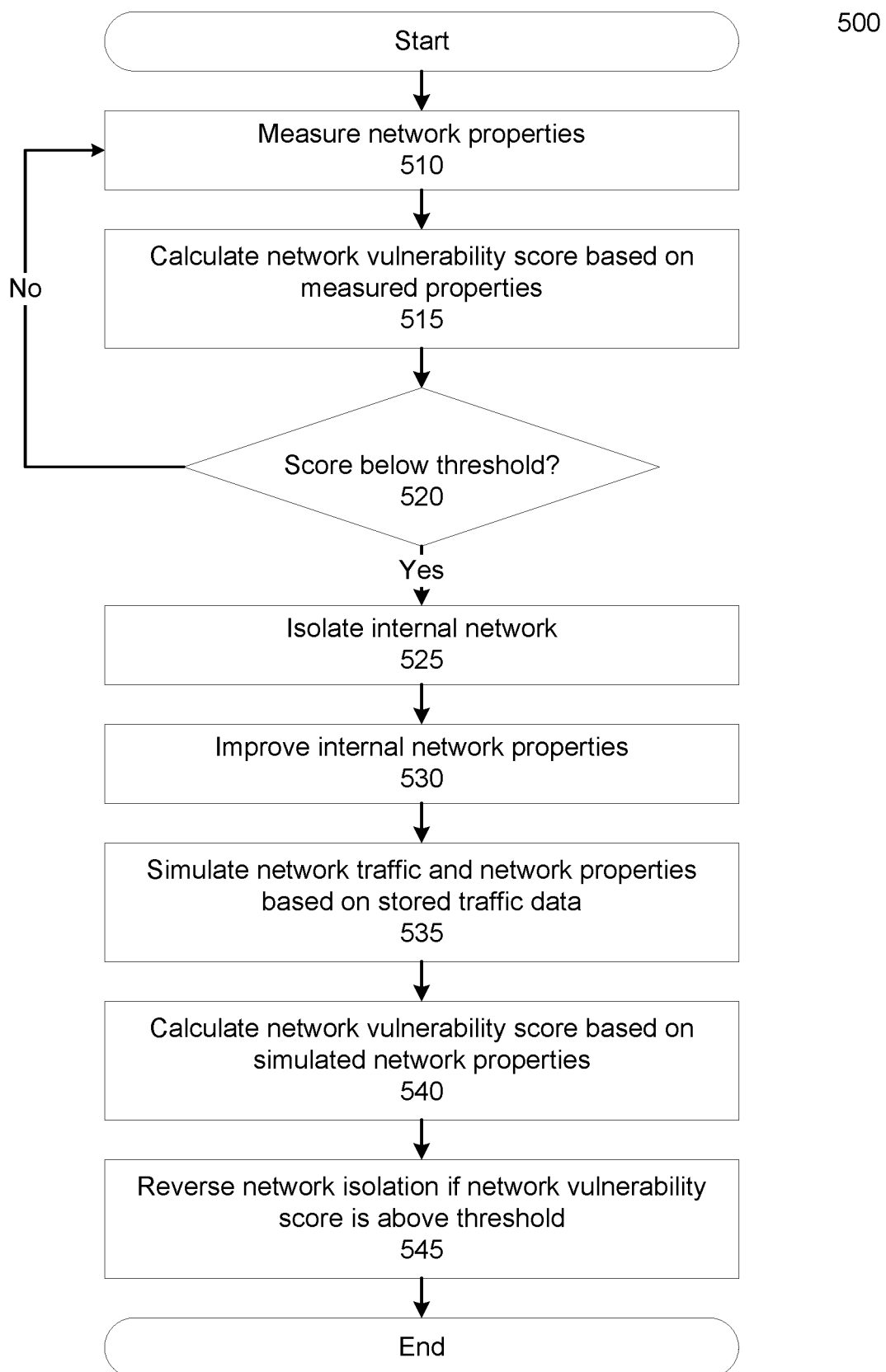
FIG. 5 is a flowchart illustrating a process for isolating a network based on a network vulnerability score, according to one embodiment.

FIG. 5 is a flowchart illustrating a process for isolating a network based on a network vulnerability score, according to one embodiment. The process 500 begins when the operator node measures 510 network properties of the internal network, for example, based on the configuration of internal nodes of the internal network. The operator node can then calculate 515 a network vulnerability score based on the measured network properties and compare the vulnerability score to a threshold. If the score is not below 520 a set threshold, the process can return to the step 510 for the system to continue monitoring the network vulnerability score. If the score is below 520 the set threshold, the internal network can be isolated 525 from communicating with other networks. While the internal network is isolated, the network's properties can be improved 530, for example by introducing or modifying one or more policies implemented on the internal network. Then, external network traffic and the network properties can be simulated 540 based on previously stored traffic data. A simulated network vulnerability score can be calculated 540, and if the simulated network vulnerability score is above the set threshold, the network isolation can be reversed 545.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
    determining, based on received network traffic, whether a node within an internal network introduces an above-threshold level of risk of malicious action to the internal network;
    responsive to determining that the node introduces the above-threshold level of risk of malicious action to the internal network, isolating the node by instructing a DNS server of the internal network to prevent resolution of DNS requests for an IP address of the node; and
    after isolating the node:
        reconfiguring the node;
        simulating network traffic for the reconfigured node; and
        responsive to the simulated network traffic indicating that the node introduces a below-threshold level of risk of malicious action to the internal network, reversing the isolation of the node.

2. The method of claim 1, wherein simulating the network traffic comprises simulating previously received network traffic to and from the node.

3. The method of claim 2, wherein the previously received network traffic comprises network traffic received in a time interval immediately preceding the isolation of the node.

4. The method of claim 3, wherein the above-threshold level of risk is computed based on the previously received network traffic.

5. The method of claim 1, wherein the node is reconfigured based on the above-threshold level of risk.

6. The method of claim 5, wherein reconfiguring the node comprises implementing one or more reconfiguration policies on the node.

7. The method of claim 1, further comprising logging network traffic associated with the node.

8. A non-transitory computer readable storage medium comprising instructions which when executed by a processor cause the processor to perform the steps of:
    determining, based on received network traffic, whether a node within an internal network introduces an above-threshold level of risk of malicious action to the internal network;
    responsive to determining that the node introduces the above-threshold level of risk of malicious action to the internal network, isolating the node by instructing a DNS server of the internal network to prevent resolution of DNS requests for an IP address of the node; and
    after isolating the node:
        reconfiguring the node;
        simulating network traffic for the reconfigured node; and
        responsive to the simulated network traffic indicating that the node introduces a below-threshold level of risk of malicious action to the internal network, reversing the isolation of the node.

9. The non-transitory computer readable storage medium of claim 8, wherein simulating the network traffic comprises simulating previously received network traffic to and from the node.

10. The non-transitory computer readable storage medium of claim 9, wherein the previously received network traffic comprises network traffic received in a time interval immediately preceding the isolation of the node.

11. The non-transitory computer readable storage medium of claim 10, wherein the above-threshold level of risk is computed based on the previously received network traffic.

12. The non-transitory computer readable storage medium of claim 8, wherein the node is reconfigured based on the above-threshold level of risk.

13. The non-transitory computer readable storage medium of claim 12, wherein reconfiguring the node comprises implementing one or more reconfiguration policies on the node.

14. The non-transitory computer readable storage medium of claim 8, further comprising logging network traffic associated with the node.

15. A system comprising:
    a plurality of nodes within an internal network configured to receive network traffic from an outside network;
    an operator node of the internal network, the operator node configured to:
        determining, based on received network traffic, whether a node of the plurality of nodes introduces an above-threshold level of risk of malicious action to the internal network;
        responsive to determining that the node introduces the above-threshold level of risk of malicious action to the internal network, isolating the node by instructing a DNS server of the internal network to prevent resolution of DNS requests for an IP address of the node; and
        after isolating the node:
            reconfiguring the node;
            simulating network traffic for the reconfigured node; and
            responsive to the simulated network traffic indicating that the node introduces a below-threshold level of risk of malicious action to the internal network, reversing the isolation of the node.

16. The system of claim 15, wherein simulating the network traffic comprises simulating previously received network traffic to and from the node.

17. The system of claim 16, wherein the previously received network traffic comprises network traffic received in a time interval immediately preceding the isolation of the node.

18. The system of claim 17, wherein the above-threshold level of risk is computed based on the previously received network traffic.

19. The system of claim 15, wherein the node is reconfigured based on the above-threshold level of risk.

20. The system of claim 19, wherein reconfiguring the node comprises implementing one or more reconfiguration policies on the node.

\* \* \* \* \*